(12) United States Patent
Choi et al.

(10) Patent No.: US 10,629,875 B2
(45) Date of Patent: Apr. 21, 2020

(54) BATTERY MODULE

(71) Applicant: LG CHEM, LTD., Seoul (KR)

(72) Inventors: Mi-Geum Choi, Daejeon (KR);
Jeong-O Mun, Daejeon (KR); Dal-Mo Kang, Daejeon (KR); Eun-Gyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 22 days.

(21) Appl. No.: 15/776,885

(22) PCT Filed: Nov. 16, 2016

(86) PCT No.: PCT/KR2016/013233
§ 371 (c)(1),
(2) Date: May 17, 2018

(87) PCT Pub. No.: WO2018/034382
PCT Pub. Date: Feb. 22, 2018

(65) Prior Publication Data
US 2018/0331336 A1 Nov. 15, 2018

(30) Foreign Application Priority Data

Aug. 18, 2016 (KR) .................. 10-2016-0105056

(51) Int. Cl.
*H01M 2/10* (2006.01)
*H01M 10/613* (2014.01)
(Continued)

(52) U.S. Cl.
CPC ........... *H01M 2/1077* (2013.01); *H01M 2/10* (2013.01); *H01M 10/613* (2015.04);
(Continued)

(58) Field of Classification Search
CPC ............ H01M 2/1077; H01M 10/613; H01M 10/6554; H01M 10/625; H01M 2220/20; H01M 2/10
See application file for complete search history.

(56) References Cited

U.S. PATENT DOCUMENTS

2010/0216007 A1   8/2010  Kane et al.
2011/0206948 A1*  8/2011  Asai .................... H01M 2/0473
                                                                429/7
(Continued)

FOREIGN PATENT DOCUMENTS

CN         205452481 U    8/2016
EP         3297090 A1     3/2018
(Continued)

OTHER PUBLICATIONS

Written Opinion of the International Searching Authority, dated May 17, 2017, for International Application No. PCT/KR2016/013233.

(Continued)

*Primary Examiner* — Lisa S Park
(74) *Attorney, Agent, or Firm* — Birch, Stewart, Kolasch & Birch, LLP

(57) ABSTRACT

Disclosed is a battery module having a simple structure, facilitating reduction in weight and size, and saving manufacturing costs while securing an efficient cooling capability. The battery module includes: a plurality of pouch-type secondary batteries, each including an electrode assembly, an electrolyte, a pouch exterior, a receiving portion configured to receive the electrode assembly, and a sealing portion obtained by sealing the pouch exterior, wherein the plurality of secondary batteries are arranged in a left-and-right direction while standing in an up-and-down direction and each have a lower sealing portion that is folded; and a cooling plate including a thermally conductive material, arranged (Continued)

under the plurality of pouch-type secondary batteries while lying down in a horizontal direction, and having two or more protrusions to which lower portions of the secondary batteries are attached and a folding support portion located between the protrusions and protruding upwards, wherein the protrusions convexly protrude upwards from an upper surface of the cooling plate, and the folding support portion supports the folded lower sealing portion of each secondary battery upwards.

17 Claims, 11 Drawing Sheets

(51) Int. Cl.
    *H01M 10/625*     (2014.01)
    *H01M 10/6554*     (2014.01)

(52) U.S. Cl.
    CPC ..... *H01M 10/625* (2015.04); *H01M 10/6554* (2015.04); *H01M 2220/20* (2013.01)

(56) References Cited

U.S. PATENT DOCUMENTS

| | | | | |
|---|---|---|---|---|
| 2012/0263984 A1* | 10/2012 | Krammer | ........... | H01M 2/12 429/82 |
| 2012/0313559 A1 | 12/2012 | Tonomura et al. | | |
| 2012/0321935 A1* | 12/2012 | Kim | ........... | H01M 2/02 429/151 |
| 2012/0328908 A1 | 12/2012 | Han et al. | | |
| 2013/0022859 A1 | 1/2013 | Lim | | |
| 2013/0344380 A1 | 12/2013 | Lee et al. | | |
| 2014/0234691 A1* | 8/2014 | Lee | ........... | H01M 10/6567 429/120 |
| 2016/0036015 A1 | 2/2016 | Kim et al. | | |
| 2016/0233465 A1* | 8/2016 | Lee | ........... | H01M 10/425 |
| 2018/0019508 A1 | 1/2018 | Lee et al. | | |

FOREIGN PATENT DOCUMENTS

| | | |
|---|---|---|
| JP | 2001-307784 A | 11/2001 |
| JP | 2008-159440 A | 7/2008 |
| JP | 2009-272048 A | 11/2009 |
| JP | 2011-503800 A | 1/2011 |
| JP | 2012-256521 A | 12/2012 |
| JP | 2013-51099 A | 3/2013 |
| JP | 2017-526102 A | 9/2017 |
| KR | 10-2013-0011740 A | 1/2013 |
| KR | 10-2013-0023059 A | 3/2013 |
| KR | 10-2014-0004003 A | 1/2014 |
| KR | 10-2014-0074151 A | 6/2014 |
| KR | 10-2016-0016498 A | 2/2016 |
| WO | WO 2009/061451 A1 | 5/2009 |
| WO | WO 2011/061931 A1 | 5/2011 |

OTHER PUBLICATIONS

International Search Report for PCT/KR2016/013233 dated May 17, 2017.

* cited by examiner

BATTERY MODULE

TECHNICAL FIELD

The present application claims priority to Korean Patent Application No. 10-2016-0105056 filed on Aug. 18, 2016 in the Republic of Korea, the disclosure of which is incorporated herein by reference.

The present disclosure relates to a battery including one or more secondary batteries, and more particularly, to a battery module, which has a simple structure, is low in volume and weight, and may secure an efficient cooling capability, and a battery pack and an automobile including the same.

BACKGROUND ART

Currently commercialized secondary batteries include nickel cadmium batteries, nickel metal hydride batteries, nickel zinc batteries, lithium secondary batteries, and the like. Among these secondary batteries, since lithium secondary batteries have advantages of being freely charged and discharged due to almost no memory effect as compared with nickel-based batteries and having extremely low self-discharge rate and high energy density, lithium secondary batteries are spotlighted.

Such lithium secondary batteries mainly include a lithium-based oxide and a carbon material as a positive electrode active material and a negative electrode active material, respectively. Lithium secondary batteries include an electrode assembly, in which a positive electrode plate and a negative electrode plate respectively coated with a positive electrode active material and an negative electrode active material are arranged with a separator therebetween, and an exterior, that is, a battery case, in which the electrode assembly and an electrolyte are sealed and received.

Generally, depending upon shapes of exteriors, lithium secondary batteries may be classified into can-type secondary batteries, in which an electrode assembly is embedded in a metal can, and pouch-type secondary batteries, in which an electrode assembly is embedded in a pouch of an aluminum laminate sheet.

Recently, secondary batteries are widely used in medium and large-sized devices such as automobiles or power storage devices as well as in small-sized devices such as portable electronic devices. When secondary batteries are used in medium and large-sized devices, a large number of secondary batteries are electrically connected to each other for improving capacity and output. In particular, pouch-type secondary batteries are frequently used in medium and large-sized devices due to merits thereof such as ease of stacking, light weight, and the like.

However, since pouch-type secondary batteries are generally packaged with a battery case of a laminate sheet of aluminum and polymer resin, pouch-type secondary batteries do not have high mechanical stiffness, and it is not easy for pouch-type secondary batteries to maintain a stacked state only by themselves. Thus, when a battery module including a large number of pouch-type secondary batteries is configured, a cartridge of a polymer material is frequently used to protect secondary batteries from external impact or the like, prevent movements of secondary batteries, and facilitate stacking.

A cartridge has the shape of a hollow quadrangular plate, and in this case, four sides of the cartridge are configured to surround an outer peripheral portion of a pouch-type secondary battery. In addition, when such a cartridge is used, a large number of cartridges are stacked to constitute a battery module, and secondary batteries may be located in an empty space inside the stacked cartridges.

In addition, when a battery module is configured using such a cartridge or the like, a fastening component for fixing between cartridges may be needed. That is, when a battery module is intended to be configured using a large number of secondary batteries and a large number of cartridges, there are needed fastening components, such as bolts or belts, which are capable of fixing the secondary batteries to the cartridges. Further, in this case, a cartridge or the like needs to include a configuration, for example, a hole or the like, to which a fastening component is coupled.

Therefore, according to a battery module configuration according to the related art, additional costs for cartridges, fastening components, or the like are required, and workability may be deteriorated due to no easy assembly. In addition, since a battery module has a large volume due to such cartridges, fastening components, or the like, there is a limit in reducing the size of a battery module.

In addition, a secondary battery may exhibit deteriorated performance when having a temperature higher than a proper temperature, and may be in danger of explosion or ignition in severe cases. In particular, when a battery module is configured by stacking a large number of pouch-type secondary batteries, since heat generated from a large number of secondary batteries in a narrow space is added up, the temperature of the battery module may be more quickly and severely increased. Further, a battery module included in an automotive battery pack may be frequently exposed to direct sunlight and may be placed under high temperature conditions such as summer or desert. Therefore, when a battery module is configured by using a large number of secondary batteries, it may be extremely important to secure a stable and efficient cooling capability.

DISCLOSURE

Technical Problem

The present disclosure is designed to solve the problems of the related art, and therefore the present disclosure is directed to providing a battery module, which may secure an efficient cooling capability, have a simple and stable structure, facilitate reduction in weight and size, and save manufacturing costs, and a battery pack and an automobile including the battery module.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a plurality of pouch-type secondary batteries, each including an electrode assembly, an electrolyte, a pouch exterior, a receiving portion configured to receive the electrode assembly, and a sealing portion obtained by sealing the pouch exterior, wherein the plurality of secondary batteries are arranged in a left-and-right direction while standing in an up-and-down direction and each have a lower sealing portion that is folded; and a cooling plate including a thermally conductive material, arranged under the plurality of pouch-type secondary batteries while lying down in a horizontal direction, and having two or more protrusions to which lower portions of the secondary batteries are attached and a folding support portion located between the protrusions and protruding upwards, wherein the protrusions convexly protrude upwards from an upper surface of the cooling plate, and the folding support portion supports the folded lower sealing portion of each secondary battery upwards.

Here, a lower surface of the receiving portion of each secondary battery may be at least partially attached and fixed to an upper surface of each protrusion via an adhesive.

In addition, the adhesive may be a thermally conductive adhesive.

In addition, a lower surface of the receiving portion of each secondary battery may be at least partially attached and fixed to the upper surface of each protrusion via a double-sided adhesive tape including an adhesive layer on both surfaces thereof.

In addition, the folding support portion may bring a folded region of the lower sealing portion into contact with the lower surface of the receiving portion.

In addition, each protrusion may have an inclined surface such that at least a portion of each protrusion has a decreasing width upwards.

In addition, left and right upper surfaces of at least some of the protrusions may be respectively attached and fixed to different secondary batteries.

In addition, the protrusions and folding support portions may be alternately arranged on the upper surface of the cooling plate along the arrangement direction of the secondary batteries.

In addition, the battery module according to the present disclosure may further include: two side plates facing each other while standing at both ends of the cooling plate; and an upper plate lying down to face the cooling plate and having both ends respectively connected to upper ends of the two side plates.

Here, the cooling plate, the two side plates, and the upper plate may be integrally formed in a tubular shape.

In addition, the cooling plate may have protrusions and recesses in a front-and-rear direction.

In addition, the upper surface of the cooling plate may be at least partially coated with an electrically insulating layer.

In addition, in another aspect of the present disclosure, there is also provided a battery pack including the battery module according to the present disclosure.

In addition, in another aspect of the present disclosure, there is also provided an automobile including the battery module according to the present disclosure.

Advantageous Effects

According to an aspect of the present disclosure, the battery module including a large number of secondary batteries may have an improved cooling capability.

In particular, according to a configuration of the present disclosure, a separate cartridge or cooling pin may not be arranged between the secondary batteries and the cooling plate. Therefore, when heat is generated from the secondary batteries, the heat may be directly transferred from the secondary batteries to the cooling plate without passing through another component such as a cartridge or a cooling pin.

Therefore, according to this configuration of the present disclosure, since the number of media on a heat transfer path is reduced, the distance between secondary batteries and the cooling plate may be reduced, and thermal resistance due to contact between media may be reduced, thereby improving heat dissipation efficiency.

Moreover, according to a configuration of the present disclosure, since the secondary batteries are directly attached to the cooling plate, an air layer may be removed or reduced on a heat transfer path from the secondary batteries to the cooling plate, thereby further improving the cooling capability of the battery module.

In addition, according to this configuration of the present disclosure, since the battery module may not include a component such as a cartridge or a cooling pin, the battery module may have a simple structure, and reduction in the weight and volume of the battery module may be facilitated.

Further, according to this configuration of the present disclosure, an assembly process of the battery module may be simplified, and the manufacturing cost thereof may be reduced.

In addition, according to an aspect of the present disclosure, the secondary batteries may be directly attached and fixed to the cooling plate. Therefore, there may be no need to separately prepare cartridges, fastening members for fixing the cartridges to each other, and the like.

Further, according to an aspect of the present disclosure, the contact area between the secondary batteries and the cooling plate may be increased, thereby improving the cooling capability of the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
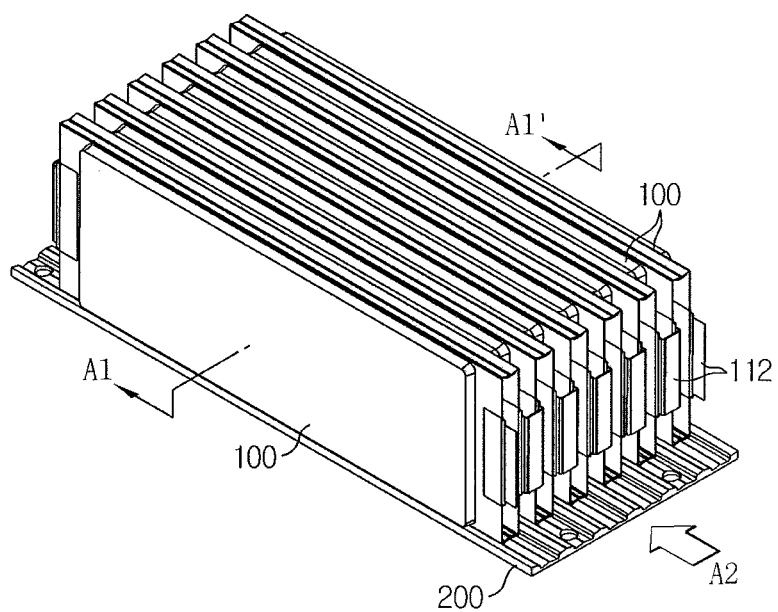
FIG. 1 is a schematic perspective view illustrating a configuration of a battery module according to an embodiment of the present disclosure.
Figure 2:
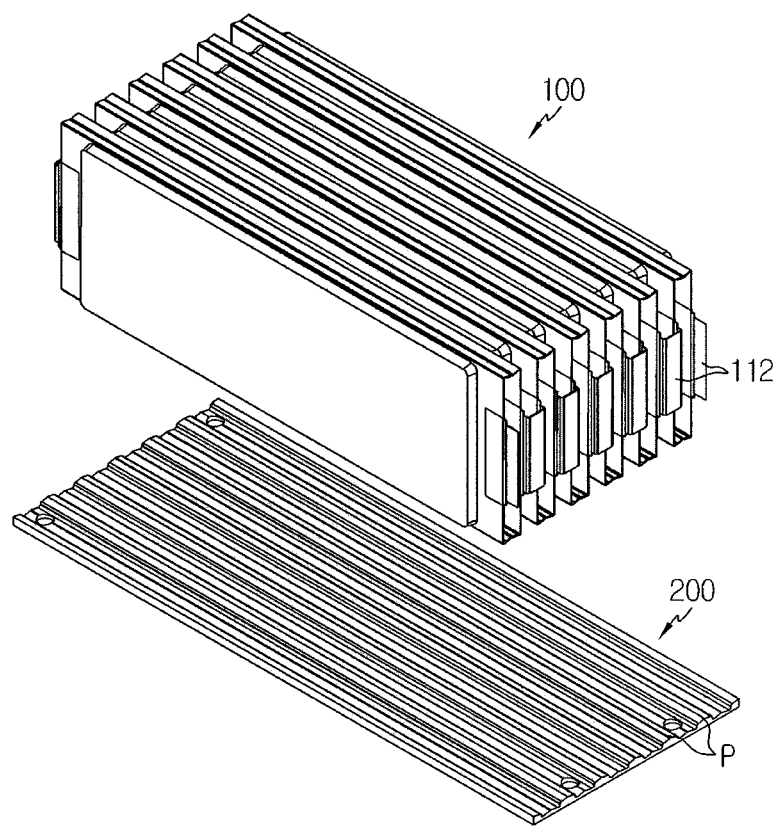
FIG. 2 is an exploded perspective view of a partial configuration of FIG. 1.
Figure 3:
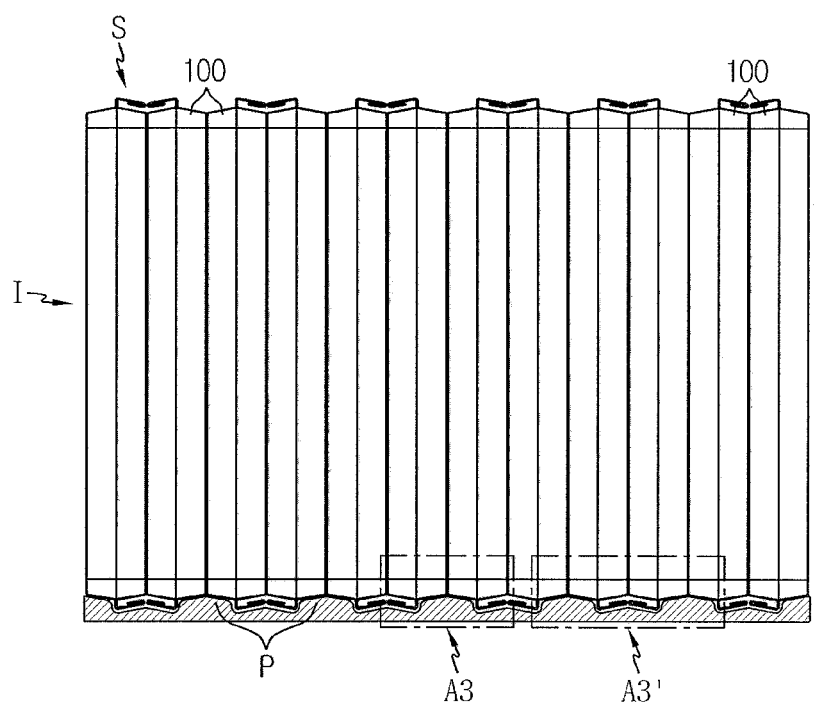
FIG. 3 is a cross-sectional view taken along a line A1-A1' of FIG. 1.

FIG. 1 is a schematic perspective view illustrating a configuration of a battery module according to an embodiment of the present disclosure. In addition, FIG. 2 is an exploded perspective view of a partial configuration of FIG. 1, and FIG. 3 is a cross-sectional view taken along a line A1-A1' of FIG. 1. However, internal components of a secondary battery are not illustrated in FIG. 3 for convenience.

Referring to FIGS. 1 to 3, the battery module according to the present disclosure may include a secondary battery 100 and a cooling plate 200.

One battery module may include a plurality of secondary batteries 100. In particular, each of the plurality of secondary batteries 100 may include a pouch-type secondary battery. Such a pouch-type secondary battery 100 may include an electrode assembly, an electrolyte, and a pouch exterior. A configuration of the pouch-type secondary battery 100 will be described in more detail with reference to FIGS. 4 and 5.

Figure 4:
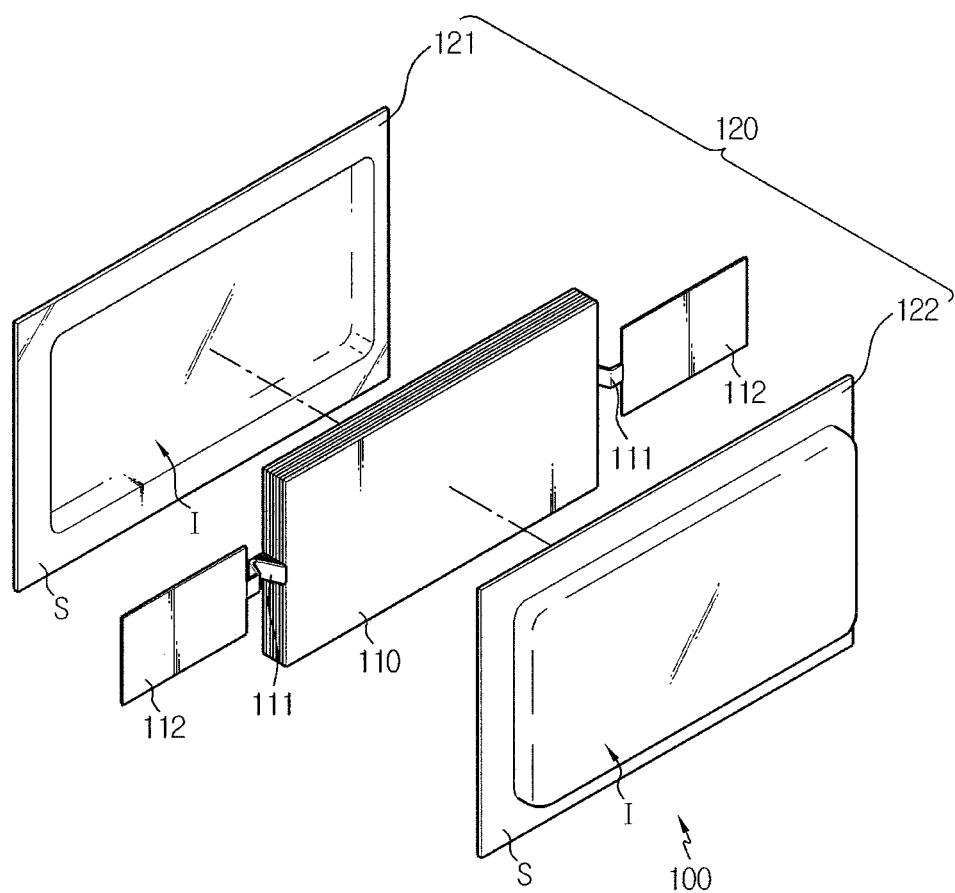
FIG. 4 is a schematic exploded perspective view illustrating a configuration of a pouch-type secondary battery according to an embodiment of the present disclosure.
Figure 5:
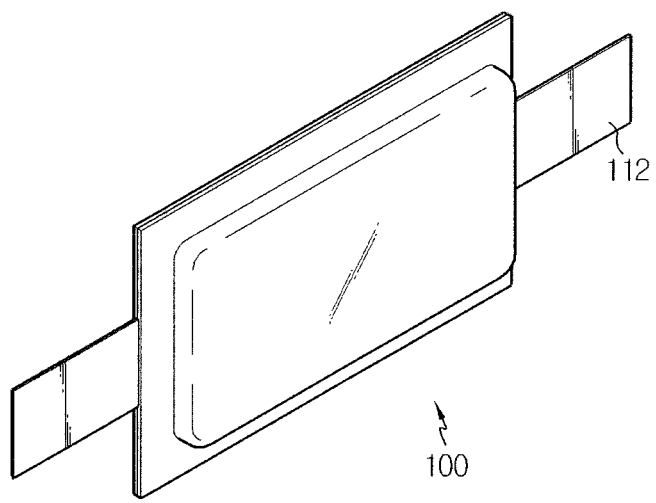
FIG. 5 is an assembled perspective view of the configuration of FIG. 4.

FIG. 4 is a schematic exploded perspective view illustrating a configuration of the pouch-type secondary battery 100 according to an embodiment of the present disclosure, and FIG. 5 is an assembled perspective view of the configuration of FIG. 4.

An electrode assembly 110 may have a structure in which one or more positive electrode plates and one or more negative electrode plates are arranged with a separator interposed therebetween. More specifically, the electrode assembly 110 may be classified into a winding-type electrode assembly, in which one positive electrode plate and one negative electrode plate are wound together with a separator, a stack-type electrode assembly, in which a large number of positive electrode plates and a large number of negative electrode plates are alternately stacked with a separator interposed therebetween, and the like.

In addition, a pouch exterior 120 may include an outer insulating layer, a metal layer, and an inner adhesive layer, in the case of the pouch-type secondary battery 100. In particular, the pouch exterior 120 may include a metal thin film, for example, an aluminum thin film, to protect internal components such as the electrode assembly 110 and an electrolyte, supplement electrochemical properties due to the electrode assembly 110 and the electrolyte, and improve heat dissipation properties or the like. In addition, the aluminum thin film may be arranged between the insulating layer including an insulating material and the inner adhesive layer to secure electrical insulation between components internal to the secondary battery 100, such as the electrode assembly 110 and the electrolyte, and other components external to the secondary battery 100.

In addition, the pouch exterior 120 may include a left pouch 121 and a right pouch 122, and at least one of the left pouch 121 and the right pouch 122 may include a receiving portion I formed as an inner space in a recessed shape. Further, the electrode assembly 110 may be received in the receiving portion I of the pouch. Furthermore, the left pouch 121 and the right pouch 122 respectively include sealing portions S on outer peripheral portions thereof, and inner adhesive layers of the sealing portions S are bonded to each other, whereby the receiving portion receiving the electrode assembly 110 may be sealed.

Each electrode plate of the electrode assembly 110 may include an electrode tap, and one or more electrode taps 111 may each be connected to an electrode lead 112. In addition, the electrode lead 112 is arranged between the sealing portion S of the left pouch 121 and the sealing portion S of the right pouch 122 and exposed to an outside of the pouch exterior 120, whereby the electrode lead 112 may function as an electrode terminal of the secondary battery 100.

In the battery module according to an aspect of the present disclosure, variously shaped pouch-type secondary batteries 100 known in the art may be used.

The pouch-type secondary batteries 100 may be arranged in a horizontal direction while each standing in an up-and-down direction. For example, in a configuration of FIGS. 1 and 2, assuming that the side from which the whole of electrode leads 112 are viewed is a front side of a battery module, when the battery module is viewed from the front side of the battery module, a large number of pouch-type secondary batteries 100 may be arranged in a left-and-right direction while standing vertically to the ground such that large surfaces of the pouch-type secondary batteries 100 face in left and right directions.

That is, in the battery module according to the present disclosure, the pouch-type secondary batteries 100 may be configured to stand in such a manner that large outer surfaces of receiving portions face in left and right directions and that the sealing portion is located at upper, lower, front, and rear sides of each secondary battery. In addition, the pouch-type secondary batteries 100 standing as set forth above may be arranged parallel to each other in the left-and-right direction such that large surfaces thereof face each other.

Herein, unless otherwise stated, assuming that the side from which the whole of the electrode leads 112 are viewed as protruding is a front side, directions such as front, rear, left, right, up, and down are divided on the basis of the case that the battery module is viewed from the front side, as described above. That is, on the basis of the case that the battery module is viewed in a direction marked by an arrow A2 in FIG. 1, directions such as front, rear, left, right, up, down, and the like are divided.

At least a portion of the cooling plate 200 may include a thermally conductive material. Thus, the cooling plate 200 may function to transfer heat generated from the secondary battery 100 to an outside of the battery module.

In particular, the cooling plate 200 may include a metal material. For example, the cooling plate 200 may include a single metal material, such as aluminum, copper, or iron, or an alloy material of at least one thereof, on the whole. According to this embodiment of the present disclosure, heat of the secondary battery 100 may be efficiently transferred to the outside of the battery module through the cooling plate 200, stiffness of the secondary battery 100 may be supplemented, and the battery module may be protected from external impact or the like.

Here, a refrigerant such as air or water may flow under the cooling plate 200. For this purpose, the battery module according to the present disclosure may further include a refrigerant supply unit configured to supply air, water, or the like under the cooling plate 200. In addition, the battery module according to the present disclosure may further include a flow path, such as a duct, a pipe, or a heat sink, to provide a path through which a refrigerant such as air or water flows under the cooling plate 200.

The cooling plate 200 may have an approximate plate shape, and may be arranged under the plurality of secondary batteries 100 while lying in the horizontal direction. That is, the cooling plate 200 may be arranged while lying in a direction parallel to a stacking direction of the secondary batteries 100. In addition, the plurality of secondary batteries 100 stacked in the horizontal direction may be mounted on one cooling plate 200 while vertically standing.

In particular, lower portions of the secondary batteries 100 may be attached to the cooling plate 200. That is, the secondary batteries 100 may be fixed to the cooling plate 200 while the lower portions of the secondary batteries 100 directly contact an upper surface of the cooling plate 200.

Figure 6:
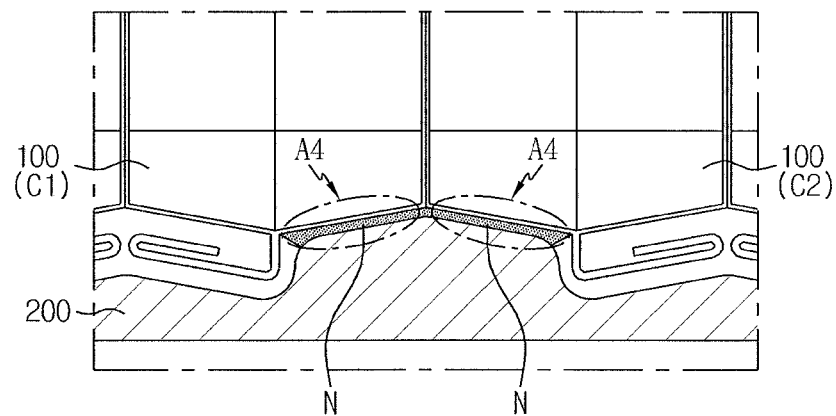
FIG. 6 is a schematic diagram illustrating a configuration in which secondary batteries are attached to a cooling plate, according to an embodiment of the present disclosure.

FIG. 6 is a schematic diagram illustrating a configuration in which the secondary batteries 100 are attached to the cooling plate 200, according to an embodiment of the present disclosure. More specifically, FIG. 6 is an enlarged view illustrating an example of a configuration of a region A3 of FIG. 3.

Referring to FIG. 6, the secondary batteries 100 may be stacked in the left-and-right direction, and a lower portion of each of the secondary batteries 100 may be mounted to the cooling plate 200. Here, an adhesive N may be arranged between the secondary batteries 100 and the cooling plate 200. That is, the secondary batteries 100 may be attached to the cooling plate 200 via the adhesive N. For example, the adhesive N may be applied to the lower portions of the secondary batteries 100 and/or the upper surface of the cooling plate 200, and the secondary batteries 100 and the cooling plate 200 may be bonded and fixed to each other via the adhesive N.

According to this configuration of the present disclosure, the secondary batteries 100 may be simply fixed to the cooling plate 200 via the adhesive N, and the battery module may not include components including cartridges, fastening components such as bolts for fixing the secondary batteries 100, or the like. Therefore, according to this aspect of the present disclosure, the structure and assembly of the battery module may be simplified, and components thereof may be reduced.

In addition, the distance between the secondary batteries 100 and the cooling plate 200 is reduced, and the number of contacts between components is reduced, whereby heat generated from the secondary batteries 100 may be more efficiently transferred to the cooling plate 200. Further, since an air layer in a space between the secondary batteries 100 and the cooling plate 200 may be removed or reduced, deterioration in heat transfer due to the air layer may be prevented.

Preferably, the adhesive may be a thermally conductive adhesive.

The thermally conductive adhesive has higher thermal conductivity than general adhesives, and thus may further improve a heat transfer amount, a heat transfer rate, and the like between the secondary batteries 100 and the cooling plate 200. Therefore, according to this embodiment of the present disclosure, dissipation capability of the heat of the secondary batteries 100 through the cooling plate 200 may be further improved, thereby further improving the cooling capability of the battery module.

In the battery module according to the present disclosure, various thermally conductive adhesives may be used. For example, in the battery module according to an embodiment of the present disclosure, various organic and/or inorganic thermally conductive adhesives, such as thermally conductive epoxy adhesives, thermally conductive silicone adhesives, thermally conductive urethane adhesives, and the like, may be used.

Figure 7:
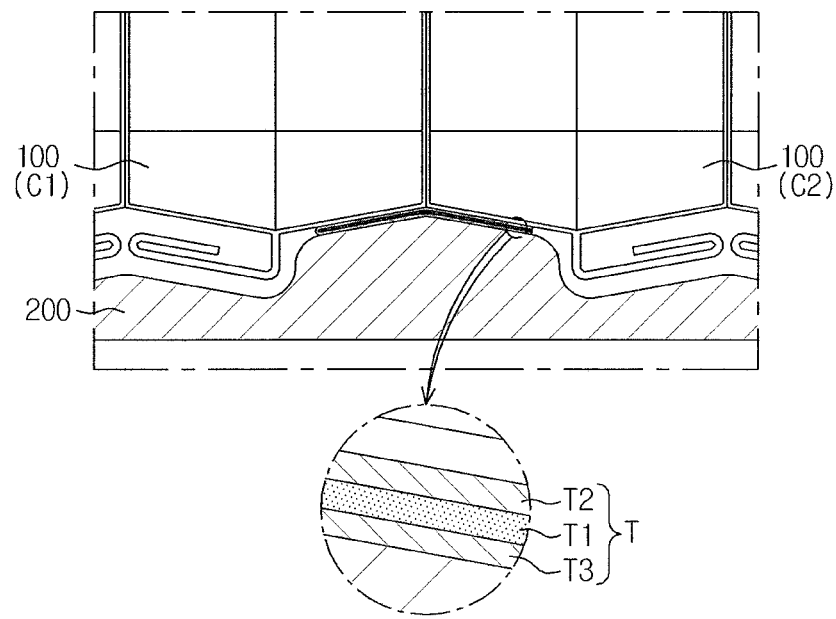
FIG. 7 is a schematic diagram illustrating a configuration in which secondary batteries are attached to a cooling plate, according to another embodiment of the present disclosure.

FIG. 7 is a schematic diagram illustrating a configuration in which the secondary batteries 100 are attached to the cooling plate 200, according to another embodiment of the present disclosure. More specifically, FIG. 7 is an enlarged view illustrating another example of the configuration of the region A3 of FIG. 3.

Referring to FIG. 7, each secondary battery 100 may be attached to the cooling plate 200 via a double-sided adhesive tape T. That is, the double-sided adhesive tape T is arranged between the secondary battery 100 and the cooling plate 200, and the secondary battery 100 and the cooling plate 200 are attached to the double-sided adhesive tape T, whereby the secondary battery 100 and the cooling plate 200 may be bonded and fixed to each other.

Here, the double-sided adhesive tape T may have a film shape and may include adhesive layers T2 and T3 on both surfaces thereof. In addition, the lower surface of the secondary battery 100 may be bonded to an upper surface of the double-sided adhesive tape T, and the upper surface of the cooling plate 200 may be bonded to a lower surface of the double-sided adhesive tape T. The double-sided adhesive tape T may include a base layer T1 between the adhesive layers T2 and T3 to maintain the shape thereof and secure a certain level or higher of stiffness. For example, the double-sided adhesive tape T may have a configuration in which the adhesive layers T2 and T3 are respectively coated on both surfaces of the base layer T1 including a material such as PE foam or acrylic foam.

According to this configuration of the present disclosure, a process of arranging the double-sided adhesive tape T at a desired position on a surface of the secondary battery 100 or the cooling plate 200 may be facilitated, and there may not occur problems such as the flow-down of the adhesive, and the like. In addition, when the base layer T1 includes a foam material or the like, if impact or vibration is applied to the battery module, the base layer T1 may at least partially absorb the impact or vibration, thereby reducing breakage of the secondary battery 100.

Preferably, the cooling plate 200 may have protrusions on a surface thereof, to which the secondary batteries 100 are mounted.

Figure 8:
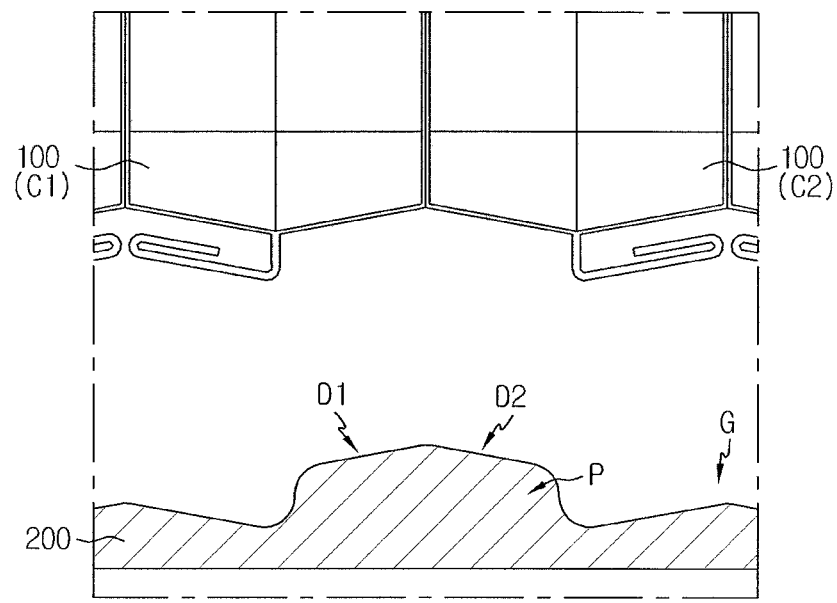
FIG. 8 is a schematic diagram illustrating that the secondary batteries are separated from the cooling plate in the configuration of FIG. 6.

FIG. 8 is a schematic diagram illustrating that the secondary batteries 100 are separated from the cooling plate 200 in the configuration of FIG. 6. However, the adhesive is not shown in FIG. 8 for convenience.

Referring to FIG. 8, the cooling plate 200 may have protrusions protruding upwards from the upper surface thereof, as denoted by P. In addition, lower regions of receiving portions of the secondary batteries may be mounted and attached onto the protrusions P. Thus, the protrusions P may support the receiving portions of the secondary batteries upwards. According to this configuration of the present disclosure, mounting positions of the secondary batteries 100 may be guided by the protrusions P, thereby improving assemblability of the battery module. In addition, the secondary batteries 100 are suppressed from moving in left and right directions due to the protrusions P, whereby a bonding force between the secondary batteries 100 and the cooling plate 200 may be further improved. Further, since the cooling plate 200 may have an increased upper surface area even when having an equal horizontal length, a contact area between the secondary batteries 100 and the cooling plate 200 may be further increased. Therefore, the amount and rate of heat transferred from the secondary batteries 100 to the cooling plate 200 may be increased, thereby improving the cooling capability of the battery module.

As shown in FIG. 3 and the like, one cooling plate 200 may have a plurality of protrusions P. According to this configuration of the present disclosure, due to the plurality of protrusions P, the bonding force between the secondary batteries 100 and the cooling plate 200 is further strengthened, and the contact area between the secondary batteries 100 and the cooling plate 200 may be further increased. In particular, when the battery module includes a slightly large number of secondary batteries 100, for example, five or more secondary batteries 100, it is good to provide a large number of protrusions P such that all of the secondary batteries 100 are contiguous to the protrusions P.

In addition, as shown in FIG. 2, the protrusions P may lengthily extend on the upper surface of the cooling plate 200 in a front-and-rear direction. That is, the protrusions P may lengthily extend from a front end to a rear end of the cooling plate 200 in a direction parallel to length directions of lower sides of the secondary batteries 100. According to this embodiment of the present disclosure, the contact area between the secondary batteries 100 and the cooling plate 200 may be increased by further increasing the surface area of the cooling plate 200. Further, according to an embodiment of the present disclosure, a fixing force between the secondary batteries 100 and the cooling plate 200 may be improved.

Also preferably, at least a portion of each protrusion P of the cooling plate 200 may have a decreasing width upwards. In this case, each protrusion P of the cooling plate 200 may have inclined surfaces as denoted by D1 and D2 in FIG. 8, the inclined surfaces being inclined at certain angles with respect to the ground on which the cooling plate 200 is placed. For example, an upper portion of each protrusion may have a triangular shape having a decreasing left-and-right directional width upwards, as shown in FIGS. 6 and 8. In particular, each protrusion may have a vertex on an upper end thereof without including a flat portion in the horizontal direction.

According to this embodiment of the present disclosure, the secondary batteries 100 may be more closely bonded to the cooling plate 200. That is, according to the above embodiment, when the secondary batteries 100 are mounted on the cooling plate 200, the secondary batteries 100 may be moved downwards along the inclined surfaces of the protrusions of the cooling plate 200, and thus be as close as possible to the cooling plate 200. Therefore, the distance between the secondary batteries 100 and the cooling plate 200 may be reduced, and the bonding force therebetween may be further improved, thereby further improving the cooling capability of the battery module.

Here, inclined surfaces of outer portions of the protrusions may be flat. That is, the inclined surfaces of the protrusions are formed as flat surfaces rather than curved or uneven surfaces, whereby the secondary batteries 100 may be smoothly moved downwards as much as possible along the inclined surfaces of the protrusions. Therefore, according to this configuration of the present disclosure, the secondary batteries 100 may be as close as possible to the cooling plate 200.

As described above, the secondary batteries 100 may each include the receiving portion I receiving the electrode assembly and the sealing portion S obtained by sealing the pouch exterior by thermal fusion or the like. Here, the receiving portion I and the sealing portion S may have different outer thicknesses (lengths in the left-and-right direction in FIG. 7) from each other. That is, in the pouch-type secondary batteries 100, the receiving portion I may be generally thicker than the sealing portion S, and thus, there may be a step between the receiving portion and the sealing portion. Therefore, when the secondary batteries 100 stand in the up-and-down direction, considerable upper and lower regions of the receiving portion may be exposed without being covered with the sealing portions S.

Here, in the secondary battery 100, the lower region of the receiving portion may be at least partially attached and fixed to the protrusion. For example, as shown in a region marked by A4 in FIG. 6, the adhesive N is arranged between a lower surface of the receiving portion of the secondary battery 100 and the inclined surfaces of the protrusion of the cooling plate 200, whereby the secondary battery 100 and the cooling plate 200 may be bonded and fixed to each other.

According to this configuration of the present disclosure, the bonding force between the secondary battery 100 and the cooling plate 200 may be further strengthened. That is, the inclined surfaces of the protrusion are inclined at certain angles with respect to a direction parallel to the ground, whereby the secondary battery 100 may be suppressed from moving both in the up-and-down direction and in the left-and-right direction. Therefore, when the secondary battery 100 is boned to the inclined surfaces of the protrusion, one bonding configuration allows the movement of secondary battery 100 in the up-and-down and left-and-right directions to be limited as much as possible.

In addition, according to this configuration of the present disclosure, the contact area between the cooling plate 200 horizontally placed in the left-and-right direction and the secondary battery 100 vertically standing in the up-and-down direction may be as large as possible. Therefore, the adhesion between the secondary battery 100 and the cooling plate 200 may be stably secured, and the heat transfer efficiency therebetween may be effectively improved.

Further, when the lower surface of the receiving portion of the secondary battery 100 is bonded to the inclined surfaces of the protrusion of the cooling plate 200 via a thermally conductive adhesive, the heat transfer efficiency between the secondary battery 100 and the cooling plate 200 may be further improved.

Furthermore, the lower surface of the receiving portion of the secondary battery 100 may be at least partially attached and fixed to the upper surface of the protrusion via a double-sided adhesive tape including an adhesive layer on both surfaces thereof. For example, as shown in FIG. 7, the double-sided adhesive tape may be arranged between the lower surface of the receiving portion of the secondary battery 100 and the inclined surfaces of the protrusion of the cooling plate 200 and attached thereto. In addition, since there is no concern of the flow-down of the double-sided adhesive tape even though the double-sided adhesive tape is arranged on the inclined surfaces of the protrusion, it may be more easily performed to arrange the double-sided adhesive tape on the lower region of the receiving portion of the secondary battery 100 and on the inclined surfaces of the cooling plate 200.

Preferably, in at least some of the protrusions, left and right upper surfaces thereof may be respectively attached and fixed to different secondary batteries 100. For example, as shown in FIG. 8, the protrusion of the cooling plate 200 may have the inclined surfaces D1 and D2 respectively on left and right sides with reference to the upper end vertex. In particular, the left inclined surface D1 and the right inclined surface D2 may have incline directions opposite to each other, an equal absolute value of an angle, and an equal length.

In such a configuration, different secondary batteries 100 may be respectively attached and fixed to the left inclined surface D1 and the right inclined surface D2 of the protrusion. For example, in the configuration shown in FIG. 8, a right lower surface of the receiving portion of a left secondary battery 100 (C1) may be bonded to the left inclined surface of the protrusion, and a left lower surface of the receiving portion of a right secondary battery 100 (C2) may be bonded to the right inclined surface of the protrusion.

In this case, two secondary batteries 100 that are adjacent with reference to one protrusion P may be bonded and fixed to each other. Therefore, according to this configuration of the present disclosure, a large number of secondary batteries 100 may be attached and fixed to a small number of protrusions P. For example, when the battery module includes an even number of secondary batteries 100, the cooling plate 200 may include the protrusions as many as half (½) the total number of the secondary batteries 100. For example, as in the configuration shown in FIG. 3, when the battery module includes 12 secondary batteries 100, the cooling plate 200 may include 6 protrusions. In addition, when the battery module includes an odd number of secondary batteries 100, the cooling plate 200 may include the protrusions as many as a number greater by one than half (½) the total number of the secondary batteries 100. In the case of this configuration, all of the secondary batteries 100 may be attached and fixed to the protrusions of the cooling plate 200.

The secondary battery 100 may include a sealing portion on each side thereof. Here, the sealing portion of the secondary battery 100 may be folded. In particular, a lower sealing portion and an upper sealing portion of the secondary battery 100 may be folded. According to this configuration of the present disclosure, the folding of the sealing portion allows the overall size of the battery module to be reduced, and in particular, the distance between the receiving portion of the secondary battery 100 and the cooling plate 200 to be reduced.

In particular, the lower sealing portion of the secondary battery 100 may be folded in a direction opposite to the protrusion. For example, in the configuration of FIG. 6, the protrusion of the cooling plate 200 is located at a right lower side of the secondary battery C1, whereby a right lower surface of the receiving portion may be attached to an inclined surface of the protrusion. Here, the lower sealing portion of the secondary battery C1 may be folded in a left direction that is an opposite direction to the protrusion. In addition, the protrusion of the cooling plate 200 is located at a left lower side of the secondary battery C2, and the lower sealing portion of the secondary battery C2 may be folded in a right direction that is an opposite direction to the protrusion to which the secondary battery C2 is attached.

According to this configuration of the present disclosure, there may be an area in which the receiving portion of the secondary battery 100 and the cooling plate 200 are in direct contact with each other without a folding portion therebetween. Therefore, heat generated from the receiving portion may be effectively transferred to the cooling plate 200. In addition, according to this configuration of the present disclosure, the fixing force of the secondary battery 100 with respect to the cooling plate 200 may be stably secured.

Further, the sealing portion of the secondary battery 100 may be folded once or more. For example, the lower sealing portion of the secondary battery 100 may be folded twice, as shown in FIG. 6 and the like. In particular, according to a configuration in which the sealing portion is folded a plurality of times in the same direction, penetration of foreign substances such as moisture into the secondary battery 100 through a thermally fused region of the sealing portion or leakage of the electrolyte out of the secondary battery 100 therethrough may be more effectively prevented.

As in the above embodiment, when the lower sealing portion of the secondary battery 100 is folded, the folded lower sealing portion may be received in a recess formed in the cooling plate 200 due to the protrusion.

For example, when the cooling plate 200 includes a plurality of protrusions, a downwardly recessed-shaped recess, as denoted by G in FIG. 8, may be formed between the protrusions. Here, the folded lower sealing portion of the secondary battery 100 may be received in the recess G.

Also preferably, the sealing portion of an outermost secondary battery 100 may be folded in an inward direction. For example, as shown in the configuration of FIG. 3, the upper and lower sealing portions of a rightmost secondary battery among the secondary batteries 100 included in the battery module may be folded in the left direction that is the inward direction. In addition, the upper and lower sealing portions of a leftmost secondary battery among the secondary batteries included in the battery module may be folded in the right direction that is the inward direction.

According to this configuration of the present disclosure, the receiving portion, instead of the sealing portion, of the secondary battery 100 is attached to an outer protrusion of the cooling plate 200, whereby the fixing force between the outermost secondary battery 100 and the cooling plate 200 may be strengthened. In addition, the sealing portion is not exposed to the outside of the battery module, whereby moisture or various foreign substances may be prevented from penetrating into the outermost secondary battery 100 through the sealing portion.

Although the configuration, in which the secondary battery 100 is attached only to the protrusion of the cooling plate 200, is mainly described in the several embodiments set forth above, the present disclosure is not limited to these embodiments.

Figure 9:
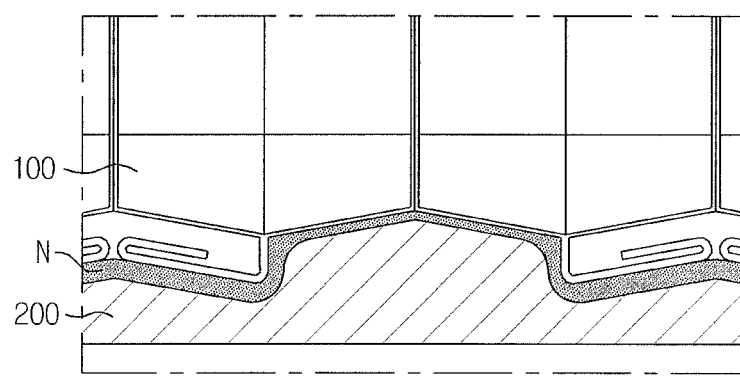
FIG. 9 is a partially enlarged view illustrating a configuration of a lower portion of a battery module according to yet another embodiment of the present disclosure.

FIG. 9 is a partially enlarged view illustrating a configuration of a lower portion of a battery module according to yet another embodiment of the present disclosure. For example, FIG. 9 illustrates another example of the configuration of the region A3 of FIG. 3.

Referring to FIG. 9, the adhesive may be provided to vertical surfaces of the protrusions as well as the upper surfaces, that is, the inclined surfaces of the protrusions of the cooling plate 200. In addition, the adhesive may also be provided to portions of the cooling plate 200 except the protrusions, for example, to at least portions of recesses G between the protrusions. In particular, the adhesive may also be arranged between a folding support portion described below and the folded sealing portion. Thus, the receiving portion and the sealing portion of the secondary battery 100 may be bonded together to the cooling plate 200.

According to this configuration of the present disclosure, since the contact area between the secondary battery 100 and the cooling plate 200 via the adhesive is increased, the bonding force and heat transfer efficiency between the secondary battery 100 and the cooling plate 200 may be improved. In addition, more air layers are removed from the heat transfer path between the secondary battery 100 and the cooling plate 200, thereby further reducing thermal resistance due to the air layers. Further, when the adhesive is applied to the cooling plate 200, since it is sufficient to apply the adhesive to the whole upper surface of the cooling plate 200 rather than only to the inclined surfaces, application processability of the adhesive or the like may be improved.

In addition, the cooling plate 200 may include a folding support portion between the protrusions P. This will be described in detail with reference to FIG. 10.

Figure 10:
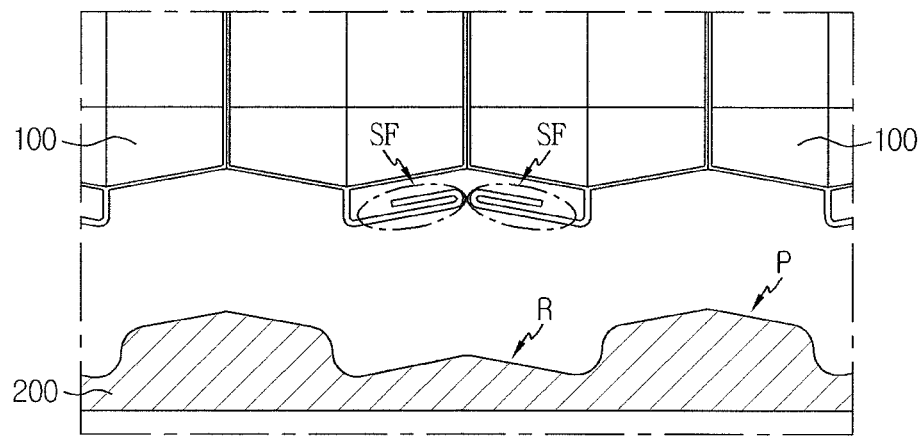
FIG. 10 is a schematic diagram illustrating that the secondary batteries are separated from the cooling plate in a region A3' of FIG. 3.

FIG. 10 is a schematic diagram illustrating that the secondary batteries are separated from the cooling plate in a region A3' of FIG. 3.

Referring to FIG. 10, the cooling plate 200 may include two or more protrusions P, and may include a folding support portion denoted by R between such a plurality of protrusions. That is, in the cooling plate, the recess G may be formed between the protrusions due to protruding shapes of the protrusions P, and the recess, instead of being flat on the whole, may include at least a portion protruding upwards and thus constituting the folding support portion. In addition, the folding support portion R may support the folded lower sealing portion of the secondary battery upwards, as denoted by SF.

Here, in a configuration in which the folding support portion R supports a folded region SF of the lower sealing portion upwards, the folding support portion and the folded region of the lower sealing portion may be in direct contact with each other or spaced apart from each other by a predetermined distance.

For example, when the battery module is configured, the folding support portion R may be spaced apart from the folded region of the lower sealing portion by a predetermined distance, instead of directly contacting the folded region, as shown in FIGS. 6 and 7. In this case, even though not directly contacting the folded region of the lower sealing portion, the folding support portion R may at least make a folding state not released and stably maintained. That is, since the folding support portion R limits downward movement of the folded region of the lower sealing portion while the secondary battery is mounted on the cooling plate, the folding state of the lower sealing portion may be maintained as it is without being released. In addition, the folding support portion R may make the lower sealing portion folded or make a folding degree severer during the process of mounting the secondary battery on the cooling plate.

Therefore, according to this configuration of the present disclosure, a metal layer for example, an aluminum layer, exposed at an end of the sealing portion may be prevented from contacting the cooling plate or another secondary battery due to the release of the folding state of the lower sealing portion, thereby improving the stability of the battery module.

As another example, when the battery module is configured, the folding support portion R may directly contact the folded region of the lower sealing portion. For example, as shown in FIG. 9, the folding support portion R may directly contact the lower sealing portion via the adhesive N or the like. In this case, the folding support portion R may make the folded region SF of the lower sealing portion not be moved downwards at all as well as the folding state of the lower sealing portion not be released. In particular, when the adhesive is arranged between the folding support portion and the lower sealing portion, the folding support portion completely fixes the folded region of the lower sealing portion, thereby fundamentally blocking the release of the folding state of the lower sealing portion and further strengthening the fixing of the secondary battery. In addition, according to this configuration, heat of the secondary battery may be more smoothly transferred to the cooling plate through the lower sealing portion. That is, since the lower sealing portion as well as the receiving portion of the secondary battery contacts the cooling plate, the heat transfer path between the secondary battery and the cooling plate may be further enlarged, thereby improving the heat dissipation rate of the secondary battery.

As shown in the several diagrams, one folding support portion R may be configured to support folded regions of two sealing portions. For example, as shown in FIG. 10, one folding support portion may have a bulging-shaped central portion and inclined surfaces respectively on left and right sides thereof, and the folded regions of the sealing portions of different secondary batteries may be respectively located on the inclined surfaces. That is, an upper region of the folding support portion may have a decreasing left-and-right-directional width upwards. In addition, the folding support portion, like the protrusion, may lengthily extend in the front-and-rear direction so as to correspond to the shape of the lower sealing portion.

Preferably, the folding support portion may be configured to bring the folded region of the lower sealing portion into contact with the lower surface of the receiving portion. This will be described in detail with reference to FIGS. 11 and 12.

Figure 11:
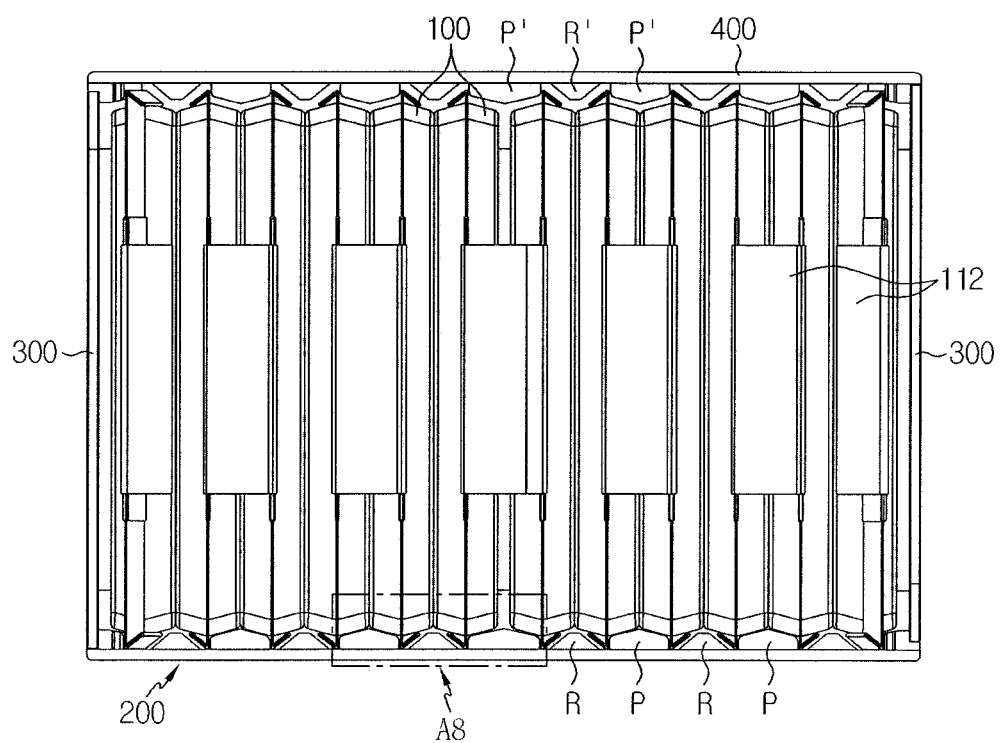
FIG. 11 is a schematic front view illustrating a configuration of a battery module according to another embodiment of the present disclosure.
Figure 12:
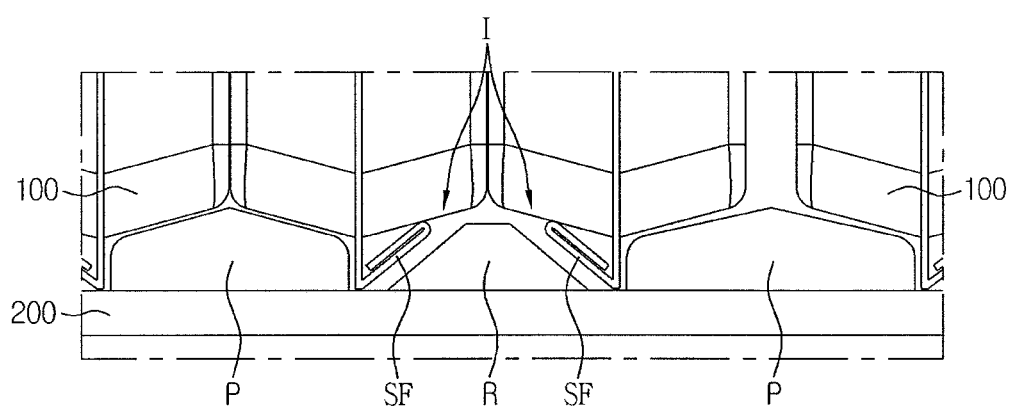
FIG. 12 is an enlarged view of a region A8 of FIG. 11.

FIG. 11 is a schematic front view illustrating a configuration of a battery module according to another embodiment of the present disclosure, and FIG. 12 is an enlarged view of a region A8 of FIG. 11. Descriptions similar to the descriptions of the previous embodiments will be omitted, and differences will be mainly described in detail.

Referring to FIGS. 11 and 12, the folding support portion R may be configured to bring the folded region SF of the lower sealing portion into contact with the lower surface of the receiving portion. In particular, referring to FIG. 12, it can be seen that the folded region of the lower sealing portion of the secondary battery partially contacts the lower surface of the receiving portion I of the secondary battery. For this purpose, the folding support portion may more highly protrude upwards than that in the previous embodiments. For example, although the folding support portion is significantly lower in height than the protrusion in the embodiment of FIG. 10, there is no significant difference in height between the folding support portion and the protrusion in this embodiment. Therefore, the folded region of the lower sealing portion may be further bent upwards, and thus, an upper end of the folded region may contact the lower surface of the receiving portion.

According to this configuration of the present disclosure, the up-and-down-directional thickness of the cooling plate may be increased due to the increased size of the folding support portion, thereby reinforcing the stiffness of the cooling plate. Therefore, the capability of the cooling plate to protect the battery module from impact on a lower portion of the battery module may be further improved. In addition, since heat of the secondary battery may also be transferred to the cooling plate through a contact region between the folded sealing portion and the receiving portion, the cooling capability of the battery module may be further improved.

The protrusions and folding support portions may be alternately arranged on the upper surface of the cooling plate along the arrangement direction of the secondary batteries.

For example, referring to the configuration shown in FIG. 11, the cooling plate may include the protrusion, the folding support portion, the protrusion, the folding support portion, the protrusion, etc., which are arranged from left to right in this stated order.

According to this configuration, a process of assembling the secondary batteries and the cooling plate may be easily performed, and the structure of the cooling plate may be simplified. In addition, an increase in low-thickness portions of the cooling plate may be prevented, thereby securing the stiffness of the cooling plate at a certain level or higher.

Also preferably, as shown in FIG. 11, the battery module according to the present disclosure may further include side plates 300 and an upper plate 400.

The side plates 300 may each have a plate shape, and may be arranged to face each other while standing at both ends of the cooling plate 200. For example, as shown in FIG. 11, the side plates 300 may be respectively arranged at both stacking-directional ends, that is, left and right sides of a stacked body of the secondary batteries. In particular, the side plates may be perpendicular to a planar direction of the cooling plate at left and right ends of the cooling plate. In addition, lower ends of the side plates may be coupled and fixed to the cooling plate.

The upper plate 400 may have an approximate plate shape and may lie down like the cooling plate. In addition, the upper plate may be arranged to face the cooling plate while spaced apart from the cooling plate by a predetermined distance, and may have both ends respectively connected to upper ends of two side plates. For example, in the embodiment of FIG. 11, left and right ends of the upper plate may be respectively coupled and fixed to an upper end of a left side plate and an upper end of a right side plate.

The side plates and the upper plate, together with the cooling plate, may constitute a case of the battery module. Therefore, components, particularly the secondary batteries internal to the battery module may be protected from external impact, foreign substances, or the like, due to the cooling plate, the side plates, and the upper plate.

The side plates and the upper plate, like the cooling plate, may include a metal material. In this case, the side plates and the upper plate may stably secure stiffness as portions of the case, and may also perform a cooling function. In particular, the side plates and the upper plate may include the same material as the cooling plate.

Although there is a difference in that the upper plate is located on the secondary batteries rather than under the secondary batteries, several configurations of the cooling plate may be similarly applied to the upper plate. For example, as shown in FIG. 11, the upper plate may include an upper protrusion P' and/or an upper folding support portion R'. Here, the upper protrusion P', which corresponds to the protrusion P of the cooling plate, may protrude downwards and be formed in a shape corresponding to the receiving portion of the secondary battery. In addition, the upper folding support portion R', which corresponds to the folding support portion R of the cooling plate, may protrude downwards between upper protrusions P' and support the folded region of the upper sealing portion downwards, thereby maintaining the folding state of the upper sealing portion.

Preferably, the cooling plate 200, the two side plates 300, and the upper plate 400 may be integrally formed in a tubular shape.

For example, in the configuration of FIG. 11, the cooling plate 200, the two side plates 300, and the upper plate 400 may be originally integrated by a method of extrusion or the like, rather than combined after separately manufactured. In this case, the cooling plate 200, the two side plates 300, and the upper plate 400 may include the same material and be formed in a tubular shape as a whole.

Figure 13:
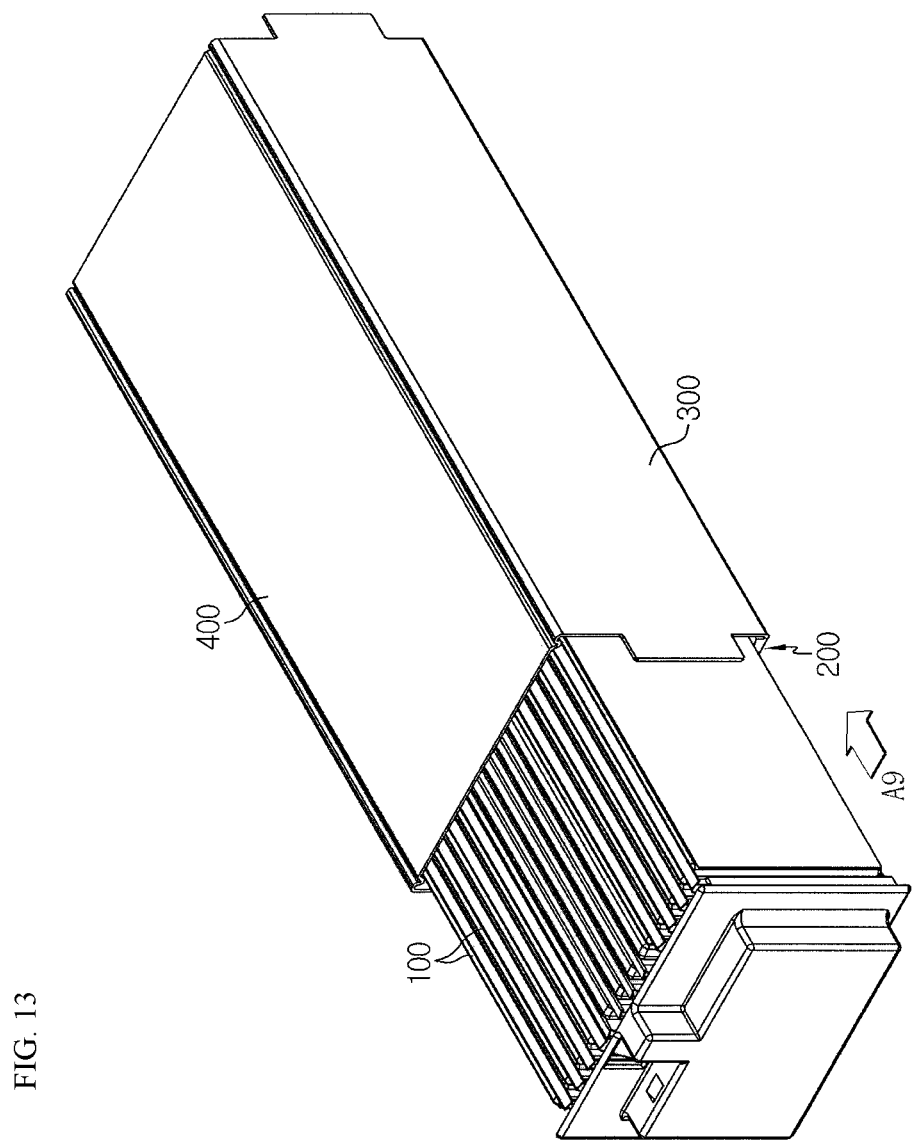
FIG. 13 is a schematic diagram illustrating a configuration of a battery module according to yet another embodiment of the present disclosure.

FIG. 13 is a schematic diagram illustrating a configuration of a battery module according to yet another embodiment of the present disclosure.

Referring to FIG. 13, the battery module may include a module case formed by integrating the cooling plate 200, the two side plates 300, and the upper plate 400. That is, in the embodiment of FIG. 13, the module case may have a configuration in which upper, lower, left side, and right side portions thereof are integrated as a whole rather than combined afterward by a separate coupling method such as welding, bolting, hook fastening, or the like.

In addition, the module case may be opened at a front end and/or a rear end thereof, and the stacked body of the secondary batteries may be inserted through such an open end. That is, in FIG. 13, as indicated by an arrow A9, the stacked body of the secondary batteries 100 may be slid from an open front end of the module case into an inner space of the module case, which is defined by the cooling plate, the side plates, and the upper plate.

According to this configuration of the present disclosure, since the cooling plate, the side plates, and the upper plate are originally integrated without a separate coupling configuration therebetween, a process of manufacturing the module case may be facilitated, a period of time for manufacturing the module case may be reduced, and the stiffness of the module case may be effectively improved.

Also preferably, the cooling plate may have protrusions and recesses in the front-and-rear direction. This will be described in detail with reference to FIG. 14.

Figure 14:
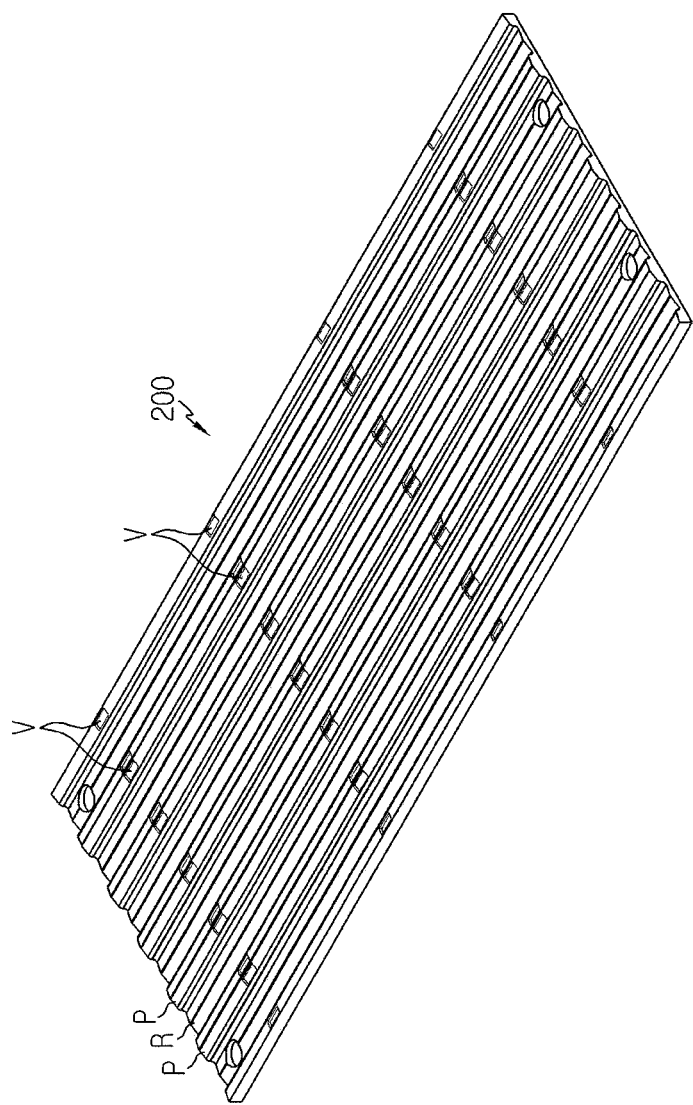
FIG. 14 is a schematic perspective view illustrating a configuration of a cooling plate according to another embodiment of the present disclosure.

FIG. 14 is a schematic perspective view illustrating a configuration of a cooling plate according to another embodiment of the present disclosure. Here, differences from the embodiments set forth above will be mainly described.

Referring to FIG. 14, the cooling plate may include retaining grooves in an upper portion thereof, as denoted by V. The retaining grooves V may each have a shape recessed from the upper surface of the cooling plate downwards as much as a predetermined depth. In addition, the retaining grooves V may be configured to form protrusions and recesses in the front-and-rear direction. That is, the retaining grooves V may be configured to form protruding shapes and/or recessed shapes in the front-and-rear direction of the battery module.

In the case of this configuration, the adhesive may be retained in the retaining grooves V. That is, the adhesive may be arranged between the upper surface of the cooling plate and the secondary batteries, and a more amount of the adhesive may be present in the retaining grooves. Therefore, in this case, due to the adhesive retained in the retaining grooves, the adhesion between the secondary batteries and the cooling plate may be more stably secured.

In particular, as described above, in the configuration in which the cooling plate, the side plates, and the upper plate are integrated, that is, in the configuration in which the module case has a tubular shape, the secondary batteries may be slid from the open front end toward the rear end of the module case, as shown in FIG. 13. Here, the adhesive applied to the upper surface of the cooling plate in advance may be pushed rearward, and the retaining grooves V may prevent the adhesive from being continuously pushed rearward. Therefore, according to this configuration of the present disclosure, the adhesion between the secondary batteries and the cooling plate due to the adhesive may be further strengthened.

In addition, the retaining grooves V may be formed in the protrusions. For example, as shown in FIG. 14, the retaining grooves V may be formed on the upper surfaces of the protrusions P. The protrusions of the cooling plate may be bonded and fixed to the receiving portions of the secondary batteries, and in this case, the retaining grooves may be formed on the upper surfaces of the protrusions and thus make a more amount of the adhesive retained between the receiving portions of the secondary batteries and the protrusions of the cooling plate.

Also preferably, the upper surface of the cooling plate 200 may be at least partially coated with an electrically insulating layer. This will be described in detail with reference to FIG. 15.

Figure 15:
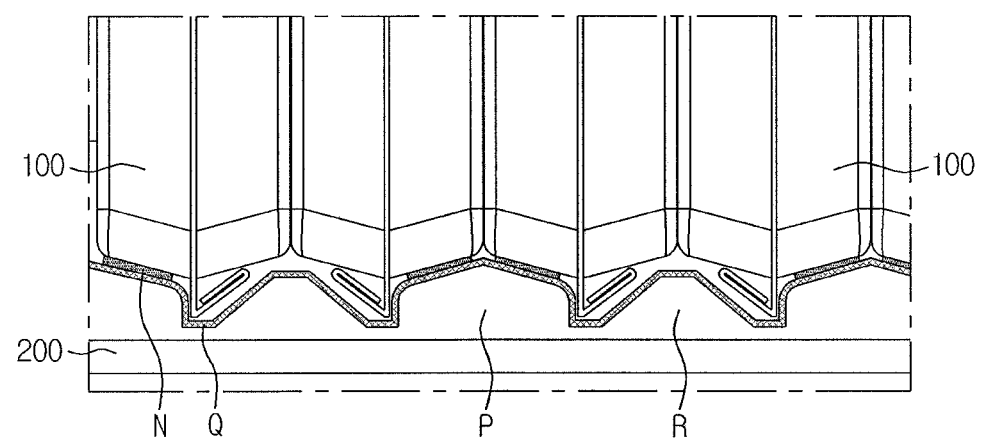
FIG. 15 is a schematic front view illustrating a partial configuration of a battery module according to yet another embodiment of the present disclosure.

FIG. 15 is a schematic front view illustrating a partial configuration of a battery module according to yet another embodiment of the present disclosure. Hereinafter, differences from the embodiments set forth above will be mainly described.

Referring to FIG. 15, the upper surface of the cooling plate 200 may be coated with an electrically insulating layer denoted by Q. In particular, the electrically insulating layer Q may be coated on the folding support portion R as well as the protrusion P of the cooling plate.

The electrically insulating layer Q may be formed in various manners, such as powder coating, plating, insulating sheet, and the like, and the present disclosure is not limited to specific methods of forming the electrically insulating layer.

According to this configuration of the present disclosure, electrical insulation between the secondary battery 100 and the cooling plate 200 may be stably secured due to the electrically insulating layer Q. In particular, even though cracks are generated in a folding region of the lower sealing portion of the secondary battery or a metal layer at an end of the sealing portion is exposed and brought into contact with the cooling plate, the electrically insulating layer Q may prevent a short circuit from being generated inside the battery module.

The electrically insulating layer Q may be arranged on the upper plate as well as the cooling plate. That is, the lower surface of the upper plate may be coated with the electrically insulating layer. In this case, both upper and lower portions of the secondary battery secure electrical insulation, whereby a withstand voltage performance of the battery module may be stably secured.

The pouch-type secondary battery 100 may have an approximate rectangular shape, when viewed from top to bottom while lying down. Here, an outer peripheral portion of the pouch-type secondary battery 100 may have two long sides and two short sides. For example, referring to FIGS. 1 and 5, a rim portion of the pouch-type secondary battery 100 may have four sides, and among these sides, two sides may be short in length, and remaining two sides may be relatively long in length. Here, at least one of the two long sides of the pouch-type secondary battery 100 may be attached and fixed to the cooling plate 200. For example, in the configuration shown in FIGS. 1 and 2, the plurality of pouch-type secondary batteries 100 may be stacked in the left-and-right direction while standing in the up-and-down direction, and each secondary battery 100 may have two long sides respectively located in upper and lower portions thereof and two short sides respectively located in front and rear portions thereof. In addition, a lower long side of each secondary battery 100 may be attached to the cooling plate 200 via an adhesive, an adhesive tape, or the like.

According to this embodiment of the present disclosure, the long side of the outer peripheral portion of the secondary battery 100 is bonded to the cooling plate 200, thereby further improving the fixing force due to bonding. In addition, the secondary battery 100 and the cooling plate 200 are in direct contact with each other in a larger area, thereby further improving the heat transfer efficiency between the secondary battery 100 and the cooling plate 200. Further, since the electrode lead 112 may protrude from the short side of the pouch-type secondary battery 100, it is good to apply the adhesive to the long side rather than to the short side.

In addition, the secondary batteries 100 may be stacked such that large surfaces thereof are in face-to-face contact with each other. For example, as shown in FIGS. 3 and 11, when the secondary batteries 100 are stacked in the left-and-right direction, large surfaces of each secondary battery 100, that is, the outer surfaces of the receiving portions face in the left and right directions, and the outer surface of each receiving portion may be in face-to-face contact with the outer surface of the receiving portion of an adjacent secondary battery 100.

According to this configuration of the present disclosure, reduction in size and weight of the battery module may be easily accomplished. In addition, according to an aspect of the present disclosure, all of the secondary batteries 100 may directly exchange heat with the cooling plate 200 under the secondary batteries 100. Thus, the battery module may not have a configuration like a battery module configuration according to the related art, in which a cooling pin is arranged between the secondary batteries 100. Therefore, the battery module according to the present disclosure allows the secondary batteries 100 to be in direct face-to-face contact with each other, and thus, may be compact and light and have a simple structure.

A battery pack according to the present disclosure may include one or more battery modules according to the present disclosure. In addition, the battery pack according to the present disclosure, in addition to the battery modules, may further include a pack case for receiving the battery modules, and various devices for controlling charge and discharge of the battery modules, for example, BMS, a current sensor, a fuse, and the like.

The battery module according to the present disclosure may be applied to automobiles such as electric vehicles or hybrid vehicles. That is, an automobile according to the present disclosure may include the battery module according to the present disclosure. In particular, in the case of automobiles obtaining driving power from batteries, such as electric vehicles, the cooling capability of the battery module is extremely important. Therefore, when the battery module according to the present disclosure is applied to theses automobiles, the stable and safe battery module due to the effective cooling capability thereof may be provided.

Although the present disclosure has been described in detail with reference to some embodiments in conjunction with the accompanying drawings, it should be understood that the present disclosure is not limited by the foregoing embodiments, and that various modifications and changes can be made by one of ordinary skill in the art without departing from the scope of the disclosure.

As used herein, terms indicating directions such as "up", "down", "left", "right", "front", and "rear" indicate relative positions and are only for convenience of description, and it will be obvious to those skilled in the art that these terms may vary depending upon positions of an object, positions of an observer, or the like.

What is claimed is:

1. A battery module comprising:
a plurality of pouch-type secondary batteries, each comprising an electrode assembly, an electrolyte, and a pouch exterior, each of the plurality of pouch-type secondary batteries having a receiving portion configured to receive the electrode assembly and a sealing portion obtained by sealing the pouch exterior, wherein the plurality of secondary batteries are arranged in a left-and-right direction while standing in an up-and-down direction and each have a lower sealing portion that is folded; and
a cooling plate comprising a thermally conductive material, arranged under the plurality of pouch-type secondary batteries while lying down in a horizontal direction, and having two or more protrusions to which lower portions of the receiving portion of the plurality of secondary batteries are attached and a fold support portion located between the protrusions and protruding upwards,
wherein the protrusions convexly protrude upwards from an upper surface of the cooling plate, and the fold support portion supports the folded lower sealing portion of each secondary battery by directly contacting the fold support portion, and
wherein the folded lower sealing portion is interposed between an upper surface of the fold support portion and a lower surface of the pouch exterior.

2. The battery module according to claim 1, wherein a lower surface of the receiving portion of each secondary battery is at least partially attached and fixed to an upper surface of each protrusion via an adhesive.

3. The battery module according to claim 2, wherein the adhesive is a thermally conductive adhesive.

4. The battery module according to claim 1, wherein a lower surface of the receiving portion of each secondary battery is at least partially attached and fixed to the upper surface of each protrusion via a double-sided adhesive tape comprising an adhesive layer on both surfaces thereof.

5. The battery module according to claim 1, wherein the fold support portion is configured to bring a folded region of the folded lower sealing portion into contact with a lower surface of the receiving portion.

6. The battery module according to claim 1, wherein each protrusion has an inclined surface such that at least a portion of each protrusion has a decreasing width upwards.

7. The battery module according to claim 6, wherein left and right upper surfaces of at least some of the protrusions are respectively attached and fixed to different secondary batteries.

8. The battery module according to claim 1, wherein the protrusions and fold support portion are alternately arranged on the upper surface of the cooling plate along the arrangement direction of the secondary batteries.

9. The battery module according to claim 1, further comprising:
two side plates facing each other while standing at opposite ends of the cooling plate; and
an upper plate lying down to face the cooling plate and having opposite ends respectively connected to upper ends of the two side plates.

10. The battery module according to claim 9, wherein the cooling plate, the two side plates, and the upper plate are integrally formed in a tubular shape.

11. The battery module according to claim 1, wherein the cooling plate has protrusions and recesses in a front-and-rear direction.

12. The battery module according to claim 1, wherein the upper surface of the cooling plate is at least partially coated with an electrically insulating layer.

13. A battery pack comprising the battery module according to claim 1.

14. An automobile comprising the battery module according to claim 1.

15. The battery module according to claim 1, wherein the upper surface of the fold support portion is inclined relative to a bottom surface of the cooling plate.

16. The battery module according to claim 1, wherein the upper surface of the fold support portion has two inclined surfaces relative to a bottom surface of the cooling plate, and
wherein the two inclined surfaces meet at a peak in the upper surface of the fold support portion.

17. The battery module according to claim 1, wherein the fold support portion has an inclined surface relative to a bottom surface of the cooling plate, and
wherein the incline surface of the fold support portion is approximately parallel to the folded lower sealing portion of a secondary battery among the plurality of secondary batteries and a lower portion of the receiving portion of the secondary battery.

* * * * *